US012806772B2

(12) United States Patent
Qian et al.

(10) Patent No.: US 12,806,772 B2
(45) Date of Patent: Nov. 24, 2026

(54) METHOD AND APPARATUS FOR ROBOT CONTROL

(71) Applicant: ABB SCHWEIZ AG, Baden (CH)

(72) Inventors: Changnian Qian, Shanghai (CN); Bojun Ma, Shanghai (CN); Wengui Pan, Shanghai (CN)

(73) Assignee: ABB Schweiz AG, Baden (CH)

( * ) Notice: Subject to any disclaimer, the term of this patent is extended or adjusted under 35 U.S.C. 154(b) by 396 days.

(21) Appl. No.: 17/754,907

(22) PCT Filed: Oct. 23, 2019

(86) PCT No.: PCT/CN2019/112827
§ 371 (c)(1),
(2) Date: Apr. 15, 2022

(87) PCT Pub. No.: WO2021/077339
PCT Pub. Date: Apr. 29, 2021

(65) Prior Publication Data
US 2024/0300101 A1 Sep. 12, 2024

(51) Int. Cl.
*B25J 9/16* (2006.01)
*G05B 19/4155* (2006.01)
*G05B 19/423* (2006.01)

(52) U.S. Cl.
CPC ........ *B25J 9/1633* (2013.01); *G05B 19/4155* (2013.01); *G05B 2219/40269* (2013.01)

(58) Field of Classification Search
CPC ..... B25J 9/1633; B25J 9/00; B25J 9/16; B25J 9/0081; B25J 9/163; B25J 13/081;
(Continued)

(56) References Cited

U.S. PATENT DOCUMENTS 10,145,747 B1 * 12/2018 Lin ........................ A61B 90/06
10,576,630 B1 3/2020 Diankov et al.
(Continued)

FOREIGN PATENT DOCUMENTS

CN 1460052 A 12/2003
CN 106239476 A 12/2016
(Continued)

OTHER PUBLICATIONS

Wikipedia: "Torque", Oct. 20, 2019, pp. 1-11.
(Continued)

*Primary Examiner* — Jonathan L Sample
*Assistant Examiner* — Byron Xavier Kasper
(74) *Attorney, Agent, or Firm* — Whitmyer IP Group LLC

(57) ABSTRACT

Embodiments of the present disclosure provide a method and a controller of controlling a robot. The method comprising detecting a pattern of a series of external forces applied on a portion of at least one arm link of the robot; comparing the pattern with a predetermined pattern associated with the portion; and in accordance with a determination that the detected pattern matches the predetermined pattern, controlling the robot to perform an action corresponding to the predetermined pattern. By introducing a pattern of a series of external forces applied on a robot to control the robot, the control of the robot can be done more intuitively. In this way, some intermediate steps such as conversion of view angle and instructions required to use the HMI-based methods are omitted, thereby improving efficiency or reliability of the robot.

19 Claims, 2 Drawing Sheets

(58) Field of Classification Search
CPC ........ B25J 13/085; B25J 9/1656; B25J 13/08; G05B 19/4155; G05B 2219/40269; G05B 19/423
See application file for complete search history.

(56) References Cited

U.S. PATENT DOCUMENTS

| | | | | |
|---|---|---|---|---|
| 2012/0010747 | A1 | 1/2012 | Okazaki | |
| 2016/0279792 | A1* | 9/2016 | Motoyoshi | B25J 9/1633 |
| 2016/0354933 | A1 | 12/2016 | Sato | |
| 2017/0028565 | A1* | 2/2017 | Matsudaira | B25J 9/1674 |
| 2017/0157778 | A1 | 6/2017 | Lee | |
| 2017/0225331 | A1* | 8/2017 | Sussman | B25J 9/1676 |
| 2018/0065256 | A1* | 3/2018 | Naitou | F16P 3/12 |
| 2018/0311836 | A1* | 11/2018 | Muneto | G01L 5/226 |
| 2019/0015972 | A1 | 1/2019 | Someya | |
| 2020/0073472 | A1 | 3/2020 | Song et al. | |
| 2020/0405405 | A1* | 12/2020 | Shelton, IV | A61B 17/068 |
| 2021/0260757 | A1* | 8/2021 | Nielsen | B25J 9/1633 |
| 2021/0362336 | A1* | 11/2021 | Muneto | B25J 9/1651 |
| 2023/0191597 | A1* | 6/2023 | Horiguchi | G05B 19/4155 180/8.6 |

FOREIGN PATENT DOCUMENTS

| | | | |
|---|---|---|---|
| CN | 106393097 | A | 2/2017 |
| CN | 106808464 | A | 6/2017 |
| CN | 107116565 | A | 9/2017 |
| CN | 107229334 | A | 10/2017 |
| CN | 107803847 | A | 3/2018 |
| CN | 109249376 | A | 1/2019 |
| CN | 107438502 | B | 5/2019 |
| CN | 110013312 | A | 7/2019 |
| CN | 110329710 | A | 10/2019 |
| CN | 110612181 | A | 12/2019 |
| EP | 1386699 | A2 | 2/2004 |
| JP | 2011093011 | A | 5/2011 |
| JP | 5375522 | B2 | 12/2013 |
| JP | 2016168650 | A | 9/2016 |
| JP | 2016209992 | A | 12/2016 |

OTHER PUBLICATIONS

European Search Report from corresponding European Application No. 19950014.1 dated Jun. 6, 2023.

Third party Observation from EP Application No. 19950014.1 dated Jun. 7, 2023.

Li Ruifeng-Harbin, "Industrial Robot Intelligence Application Technology", Force Sensing and its Applications, Harbin Institute of Technolgy Press, 2017, ISBN 978-7-5603-5717-; 5 pages.

International Search Report and Written Opinion, issued by the ISA/CN National Intellectual Property Administration, regarding corresponding patent application Serial No. PCT/CN2019/112827; dated Jul. 22, 2020; 9 pages.

* cited by examiner

METHOD AND APPARATUS FOR ROBOT CONTROL

CROSS-REFERENCE TO RELATED APPLICATIONS

This is a national stage application which claims priority to International patent application Serial No.: PCT/CN2019/112827, filed on Oct. 23, 2019; and which is herein incorporated by reference in its entirety.

FIELD

Embodiments of the present disclosure generally relate to a robot, and more specifically, to a method and a controller for controlling a robot.

BACKGROUND

A robot, especially an industrial robot is a system used for manufacturing. Industrial robots are automated, programmable and capable of movement on three or more axis. A kind of industrial robot, which is typically called a collaborative robot or cobot has been designed to work alongside or with humans through the last decades of development, and therefore has inherent safety features such as lightweight materials and rounded edges. However a robot that was not designed to work with humans can be equipped with sensors to enable collaborative operation in manufacturing environments.

Traditional display-based human-machine interfaces (HMI) are known for robots. One can cause the robot to run, stop or enter a certain mode by operating an element such as a button on a window of the HMI, for example. For instance, an engineer uses a teach pendent unit (TPU) to switch lead-through mode on to teach targets, and teaching targets. For another example, some operators also use PC based HMI to start/stop running a program, or execute command of any kind. For a collaborative robot, it is said to work in a product line just like a human coworker. However, it is inefficient to continue using the above methods to control collaborative robots.

SUMMARY

Embodiments of the present disclosure provide a method and a controller for controlling a robot.

In a first aspect, a method of controlling a robot is provided. The method comprises: detecting a pattern of a series of external forces applied on a portion of the robot; comparing the pattern with a predetermined pattern associated with the portion; and in accordance with a determination that the detected pattern matches the predetermined pattern, controlling the robot to perform an action corresponding to the predetermined pattern.

According to embodiments of the present disclosure, by introducing a pattern of a series of external forces applied on a robot to control the robot, the control of the robot can be done more intuitively. In this way, some intermediate steps such as conversion of view angle and instructions required to use the HMI-based methods are omitted, thereby improving efficiency or reliability of the robot.

In some embodiments, detecting the pattern of the series of external forces comprises: detecting a magnitude of the series of external forces applied on the portion during a predetermined time period. In this way, the method can be implemented in an easier way.

In some embodiments, detecting a magnitude the series of external forces comprises: detecting the magnitude from at least one of a torque sensor or a current sensor arranged on a joint between two arm links of the robot coupled to each other. In this way, the pattern can be detected in a more cost-efficient way.

In some embodiments, the method further comprises generating an indication of a result of the comparison between the detected pattern and the predetermined pattern. As a result, the operator can obtain whether the operation is successful or other further information, so that the control of the robot is clearer, thereby improving the user experience.

In some embodiments, generating the indication comprises at least one of the following: illuminating a lighting unit; playing back a sound; vibrating at least one arm link; or displaying the result on a display screen. In this way, the results can be presented in a variety of forms, improving the reliability of the user's control of the robot.

In some embodiments, controlling the robot to perform an action corresponding to the predetermined pattern comprises controlling the robot to perform at least one of the following actions: moving the robot to a previous or next target; initiating, ceasing, pausing or restarting a process or a step of the process to operate the target; teaching the robot to operate a new target; or increasing or decreasing a speed to operate the target. As a result, using this method can control the robot in more aspects and improve the applicability of the method while making the robot more intelligent.

In a second aspect, a controller for controlling a robot is provided. The controller comprises one or more processors configured to perform the method as mentioned in the first aspect.

In a third aspect, a robot is provided. The robot comprises a controller as mentioned in the second aspect.

In some embodiments, the robot further comprises at least one of a torque sensor or a current sensor coupled to the controller and configured to detect the magnitude of the series of external forces applied on the portion during a predetermined time period.

In some embodiments, the torque sensor is arranged on a joint between two arm links of the robot coupled to each other; and the current sensor is configured to provide a value of current applied on a motor.

In some embodiments, the robot further comprises a feedback module configured to present the indication of a result of the comparison between the detected pattern and the predetermined pattern.

In some embodiments, the feedback module comprises at least one of a lighting unit, a speaker, a driver to vibrate at least one arm link, or a display screen.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Industrial robots, with their precision and work efficiency, have become an indispensable technical means for modern production enterprises. Collaborative robots, which have been designed to work alongside or with humans, are robots that have developed in recent years. However a robot that was not designed to work with humans can be equipped with sensors to enable collaborative operation in manufacturing environments.

Industrial robots or collaborative robots can perform many tasks such as welding, painting, assembly, disassembly, picking and placing for printed circuit boards, packaging and labeling, palletizing, product inspection, and testing, or the like. In order for industrial robots or collaborative robots to perform these tasks, an operator typically needs to teach them how to operate or manually control them to complete the operation.

Currently, the operator typically employs display-based HMI to teach or control the robot. In operation, the operator can cause the robot to run, stop or operate a target by operating an element such as a button on a window of the HMI. For example, an engineer typically uses a TPU to switch lead-through mode on to teach the robot to operate targets by operating certain TPU buttons. For another example, some operators also use PC-based HMI to initiate, or cease a process, or execute a command to make the robot perform actions.

That is, currently, when controlling or teaching a robot to perform some actions, no matter whether HMI or PC-based HMI is used, an operator needs to operate the interface instead of directly controlling the robot. The operation of the interface requires conversions of spatial perspective, instructions, or the like, making the control error-prone and inefficient. These types of operations significantly decrease work efficiency especially for collaborative robots.

Figure 1:
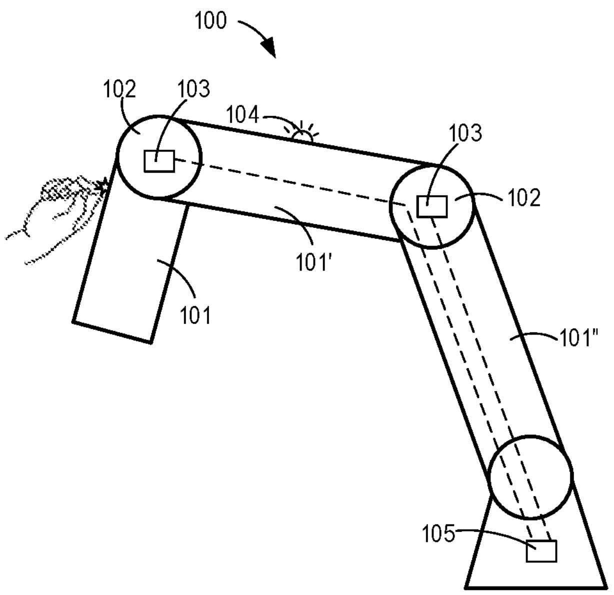
FIG. 1 shows a schematic view of an robot according to embodiments of the present disclosure.
Figure 2:
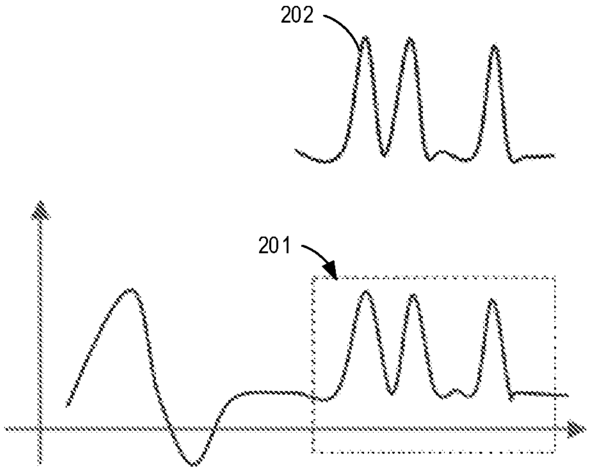
FIG. 2 shows schematic view of a pattern and a predetermined pattern to be compared according to embodiments of the present disclosure.
Figure 3:
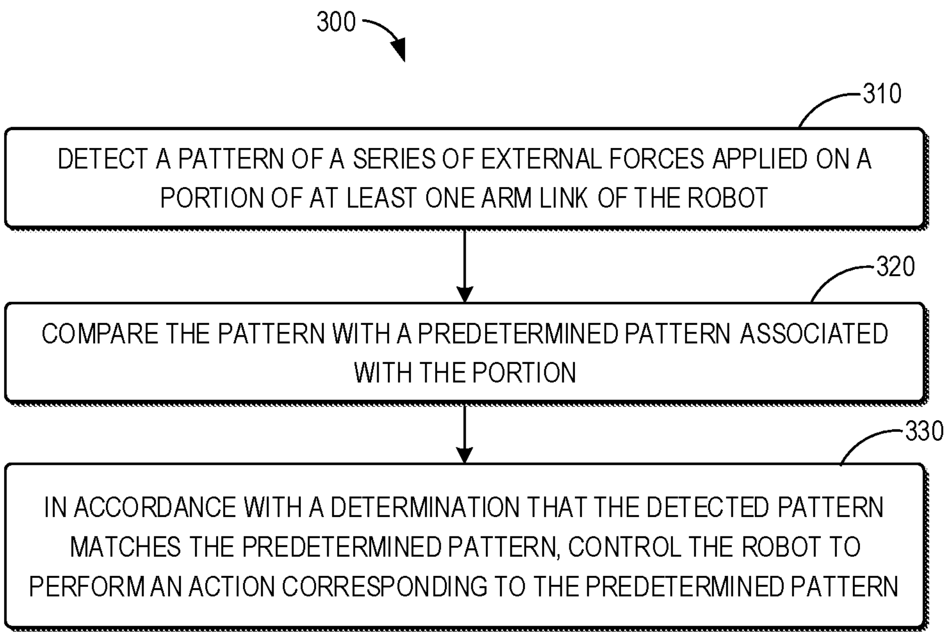
FIG. 3 shows a flowchart illustrating a method of controlling a robot according to embodiments of the present disclosure.

In order to address or at least partially address the above and other potential problems, embodiments of the present disclosure provide a method and a controller for controlling a robot 100. FIG. 1 shows a schematic view of an example robot; FIG. 2 shows schematic view of a pattern 201 and a predetermined pattern 202 to be compared; and FIG. 3 shows a flowchart illustrating a method of controlling a robot.

Generally, according to embodiments of the present disclosure, an operator can operate the robot, such as an industrial robot or a collaborative robot or the like (referred to as robot or robots hereinafter for case of discussion), by directly touching, pushing, knocking or tapping it with certain patterns. From the perspective of the robots to be controlled, the touching, pushing, knocking or tapping with certain patterns is embodied as a series of external forces. Accordingly, the patterns of the touching, pushing, knocking or tapping will be also called as patterns 201 of a series of external forces hereinafter.

The method according to embodiments of present application can be implemented in a controller 105 of the example robot 100 as shown in FIG. 1. The robot 100 performs tasks with movements of the arm links driven by motors (not shown) which are controlled by the controller 105. While FIG. 1 shows that the controller 105 is located in a base of the robot 100, it is to be understood that this is merely illustrative and is not intended to limit the scope of the present disclosure. Any other suitable location or arrangement is also possible. For instance, in some embodiments, the controller 105 may also be located in any of the arm links, joints 102 or other positions separated from the robot 100.

As shown in FIG. 1, the robot 100 further comprises a plurality of arm links 101, 101', 101" and sensors. Adjacent arm links are coupled with each other by joints 102. The sensors, such as torque sensors or current sensors, or the like may be arranged in any of the joints 102 to detect magnitudes of torques experienced by the arm link or other information about the robot 100. For example, when the robot 100 is under operation, the motor can drive the arm link to move by outputting torques, which can be detected by torque sensors, to the arm links.

Besides the torque output to the arm link 101 from the motor, the torque sensor 103 can also be used to detect external forces applied on a portion of the robot 100, i.e., the arm links or the joints, such as by touching, pushing, knocking or tapping the portion. For example, the taps on the arm link, which are external forces from the perspective of the robot 100, may cause a change of magnitudes of torques. This change may be sensed by the torque sensor 103 arranged in the joint 102. The controller 105 of the robot 100 coupled to the torque sensor 103 may combine the change of torques of the arm link 101 and the time when the change happens into a time-varying waveform as shown in FIG. 2, which belongs to patterns 201 of a series of external forces as mentioned above.

Besides the arm links, the robot 100 may also be controlled by touching, pushing, knocking or tapping other parts of the robot 100, such as the joints with a certain patterns of external forces. For example, when tapping the joint between the arm links 101, 101', the torque applied on the arm link 101' will be changed. And then the torque sensor arranged between the arm links 101', 101" would sense this change. In this way, the patterns 201 of the external forces applied on the joints may also be detected. In some alternative embodiments, in addition to or instead of the torque sensors, further sensors, such as pressure sensors for example may also be arranged on the joints to detect the pattern of the external forces applied on the joints. The idea of the present disclosure will be described further below by taking the arm link being tapped as an example. The case where other parts, such as joints of the robot 100 is tapped, pushed, touched or knocked is similar and will not be described further hereinafter.

FIG. 2 shows an example of the detected pattern 201. In FIG. 2, the horizontal ordinate represents time, and the vertical ordinate represents magnitudes of external forces. Several peaks in the waveform are produced when tapped. As shown, when an operator taps the robot 100, the change in the torque produced by the tap is detected and may be superimposed on the torque output by the motor.

Based on this phenomenon, the inventor provides a method to control the robot using a series of external forces applied on the robot 100 such as by touching, pushing, knocking or tapping the arm links. FIG. 3 shows a flowchart 300 illustrating the method. As shown, in block 310, the controller 105 of the robot 100 detects a pattern 201 of a series of external forces applied on a portion of at least one arm link 101 of the robot.

For example, according to embodiments, when an operator wants the robot 100 to perform an action, he/she would tap an arm link 101 of the robot 100, as shown in FIG. 1. The taps on the arm link, which are external forces from the perspective of the robot 100, may cause a change of magnitudes of torques. Then, as mentioned above, the controller 105 may obtain the pattern 201 of external forces as shown in FIG. 2.

FIG. 2 shows a pattern of three taps by the operator with a short interruption (which will be referred to as a null tap hereinafter) between the first two taps and the last tap. For the convenience of explanation, the pattern of taps as shown in FIG. 2 may be represented by "xx○x". The symbol "x" means one tap on the arm link 101 and "○" means a short interruption or a null tap between the taps.

It is to be understood that the pattern as shown in FIG. 2 is merely for illustrative, without suggesting any limitation as to the scope of the present disclosure. Any other suitable patterns are also possible. For example, the patterns may also be "x", "xx", "xxx", "xxxx", "x○x", "x○xx" or the like, which are all freely defined by the operator.

In addition to or instead of the torque sensors 103 as discussed above, current sensors may also be used to sense the magnitude of the taps. Specifically, in the normal operation of the robot 100, even the arm links are in stationary states, motors used to drive the arm links 101 are still active. That is to say, even if the arm links are at rest, the motors to drive them still need certain current to maintain active.

For example, when an operator taps the arm link 101 shown in FIG. 1, the controller 105 of the robot 101 controls the motor to increase the torque output to the arm link 101. In this way, the stationary state of the arm link 101 can be maintained. That is, when the operator taps the arm link 101, he/she might not feel the vibration or movement of the arm link 101. While the torque output from the motor is changed, the arm link 101 still maintains the stationary state. The change in torque requires a change in current supplied to the motor. Therefore, a change in the magnitude of the external force can also be obtained by detecting the current supplied to the motor.

It is to be understood that the embodiments regarding taps of the operator on the motor as a kind of external forces as mentioned above are merely for illustrative, without suggesting any limitation as for the scope of the present disclosure. Any other suitable forms of external forces are also possible. For example, in some alternative embodiments, the operator may also push, touch or even twist the arm link 101 of the robot 100 to control the robot. In such cases, further sensors may be needed. For example, in some embodiments, some touch sensors (not shown) or pressure sensors may be arranged on suitable positions of the arm link 101 to allow the operator to control the robot 100 by touching the arm link 101 with certain patterns.

Referring back to FIG. 3, in block 320, after detecting the pattern 201 of the series of external forces, the controller 105 compares the pattern 201 with a predetermined pattern 202 associated with the portion where the external forces are applied. That is, before the pattern 201 is detected, certain predetermined patterns 202 associated with the portions may be set previously. In some embodiments, this can be set in advance by the operator. Furthermore, the predetermined patterns 202 may also be set at any time when needed.

By way of example, some example patterns, the associated portion where the external forces occur and actions corresponding to these patterns are shown in the following table.

| NO. | Pattern | Portion | Action definition |
|---|---|---|---|
| 1 | xx | Arm link 101 | Initiate or cease a process |
| 2 | xxx | Arm link 101 | Create and teach a new target |
| 3 | x | Arm link 101 | Pause or continue |
| 4 | x○xx | Arm link 101 | Robot move to a previous target |
| 5 | xx○x | Arm link 101 | Robot move to next target |
| 6 | x○x | Arm link 101 | Open or close the gripper |
| 7 | x○xx | Arm link 101' | Increase speed |
| 8 | xx○x | Arm link 101' | Decrease speed |

For example, in some embodiments, the operator may define two consecutive taps "xx" at the arm link 101, which are corresponding to an action of causing the robot to initiate or cease a process or a step of the process to operate a target. Furthermore, three consecutive taps "xxx" at the arm link 101 may be defined to be corresponding to an action of creating a new target or teaching the robot 100 to operate a new target, and so on.

It is to be understood that the above patterns and/or actions are merely for illustrative, without suggesting any limitation as to the scope of the present disclosure. Any other suitable patterns or actions may also be possible. The operator can freely set a predetermined pattern with a corresponding action. For example, in some embodiments, the pattern "xxx" on the arm link 101 may also be used to increase a speed of the robot to operate the target and the pattern "xx" on the arm link 101 may also be used to decrease the speed of the robot to operate the target.

Moreover, as can be seen from the above table, in addition to the correlation between the patterns and the action, the portions where the external forces occur are also related to the actions. That is, the pattern of the external forces and the portion where the external forces occur together determine an action to be performed.

For example, in some embodiments, as shown in the above table, the pattern "x○xx" of the external forces applied on the arm link 101 may be predetermined to be corresponding to an action "robot move to a previous target". The pattern "x○xx" of the external forces applied on the arm link 101' may be predetermined to be corresponding to an action "increase speed".

The arm link where external forces occur can be judged according to the difference in different torque sensors 103. For example, when an operator taps the arm link 101 as shown in FIG. 1, the torque sensor 103 between the arm links 101 and 101' may detect a relative large change in the torques, while the torque sensor 103 between arm links 101' and 101" may detect a relative small change in the torques. The controller 105 then determines that the external forces are occurring on the arm link 101 according to the differences.

In some embodiments, different "portions" herein mean not only which arm link the external forces occur, but also different parts on the same arm link. For example, the same pattern of external forces occurring at the distal or proximal end can correspond to different actions, which is similar to the situation occurring on different arm links, and will not be described here. This may be enabled by further sensors arranged on the robot arm links.

Of course, it is to be understood that the above embodiments where the pattern and the portion together determine an action to be performed are merely for illustrative, without suggesting any limitation as to the scope of the present disclosure. Any other appropriate determinants are also possible. For example, in some embodiments, the action may be determined only by the pattern of the external forces without the portions being considered. That is, in those embodiments, as long as the operator taps the robot with a predetermined pattern, regardless of where the tap occurs, the robot performs an action corresponding to the predetermined pattern.

It should be understood that the embodiments in which the magnitude, portion where the external forces occur and time interval are taken as patterns are merely illustrative and are not intended to limit the scope of the present disclosure. Any other suitable parameters may also be introduced into the pattern to increase the means of controlling the robot.

For example, in some alternative embodiments, besides the pattern and the portions where the external forces occur, more other determinants, such as magnitudes and directions of the external forces or duration of a single external force may also be introduced to be used to determine the action. This further increase the means to control the robot 100.

In some embodiments, comparison of the pattern 201 with the predetermined pattern 202 may be performed by employing any suitable algorithm, such as correlation algorithm, signal feature algorithm, neural network algorithm or a combination thereof, as long as the algorithm can facilitate the comparison and removal of unnecessary noise or the like.

Referring back to FIG. 3, in block 330, in accordance with a determination that the detected pattern 201 matches the predetermined pattern, the controller 105 controls the robot 100 to perform the action corresponding to the predetermined pattern 202. For example, when an operator taps the arm link 101 with the pattern "xx", according to the predetermined patterns as shown in the above table, the robot 100 would then be controlled to initiate a process to operate a target.

Furthermore, when the operator taps the robot 100 while the robot 100 is working, the pattern "xx" of the taps applied on the arm link 101 would cause the robot 100 to cease the process. That is, the taps may be applied on the robot 100 when the robot 100 is in rest or when the robot 100 is operating the target, which makes the robot 100 more intelligent.

It can be seen from the above that by introducing a pattern 201 of a series of external forces applied on a robot 100 to control the robot 100, the control of the robot can be done more intuitively. In this way, some intermediate steps such as conversion of view angle and instructions required to use the HMI-based methods are omitted, thereby improving efficiency or reliability of the robot 100.

In some embodiments, if the detected pattern 201 does not match the predetermined pattern 202, an indication of the result of the comparison may be generated to alarm the operator. For example, in some embodiments, as shown in FIG. 1, a feedback module 104 may be arranged on the robot 100 or any other suitable positions to present the indication of the result. The feedback module 104 may be at least one of a lighting unit, a speaker, a driver to vibrate the at least one arm link or a display screen.

For example, in a case where the detected pattern 201 does not match the predetermined pattern 202, the lighting unit may be illuminated while a sound indicating failure matching may also be played back. Furthermore, the arm link where the external forces occur may be vibrated and the result may be displayed on the display screen. In this way, the feedback module 104 allows the operator to get full feedback to avoid delays.

In some embodiments, if the detected pattern 201 does not match the predetermined pattern 202, which means the detected pattern 201 is not set as a predetermined pattern 202, the feedback module may prompt the operator to set a new predetermined pattern.

For example, when the operator taps the arm link 101 with a pattern "xxxxx", which is not yet set as a predetermined pattern, then a prompt may be shown in the display screen to prompt the operator to set a new corresponding relationship between the pattern "xxxxx" and a new action.

It is to be understood that for the sake of reasonableness control, the number of taps to be set as the predetermined pattern may not be any number. When the number of taps exceeds a certain number, such as 6 times or more, the operator may malfunction due to excessive number of taps.

In addition, the time interval between every two consecutive taps may not be strictly defined, as long as the time interval between every two consecutive taps (including null taps "○", i.e., a short interruption between taps) does not affect the determination of the number of taps. To achieve this objective, in some embodiments, after each series of taps on the robot 100 and before the following comparison, the controller may wait for a predetermined time, for example, 3-6 seconds to ensure that the operator has completed all the taps for this control.

In some embodiments, the comparison of the detected pattern 201 with the predetermined pattern 202 is independent of the time interval between every two consecutive taps. That is, as long as the order of the detected pattern 201 between the tap "x" and the null tap "○" is corresponding to that of the predetermined pattern 202, the determination of the detected pattern 201 matching the predetermined pattern 202 can be made.

For example, when the predetermined pattern 202 is set, time interval between two consecutive taps (comprising null tap "○") of the determined pattern "xx○x" may be about 100 ms. Although time interval between two consecutive taps (comprising null tap "○") of the detected pattern "xx○x" is about 200 ms, the controller 105 may determine that the detected pattern 201 matches the predetermined pattern 202 and then can control the robot 100 to perform the action corresponding to the determined pattern "xx○x".

Furthermore, in some embodiments, in a case where the detected pattern 201 matches the predetermined pattern 202, feedback may also be provided to the operator. For example, upon a determination that the detected pattern 201 matches the predetermined pattern 202, the display screen may then display the action to be performed by the robot 100. If the operator wants to cancel the action, he/she can touch a corresponding button on the screen for e.g., 1-3 seconds, which can effectively avoid misuse.

Embodiments of the present disclosure further provide a controller 105 for controlling a robot 100. The controller 105 comprises one or more processors configured to perform the method as mentioned above.

Furthermore, embodiments of the present disclosure further provide a robot 100 comprising the controller 105 as mentioned above. In some embodiments, the controller 105 may be integrally or separately formed with a control system of the robot 100.

In some embodiments, the robot 100 may comprise at least one of a torque sensor or a current sensor coupled to the controller and configured to detect a magnitude of each of the series of external forces applied on the portion during a predetermined time period.

In some embodiments, the robot 100 may comprise a feedback module 104 configured to present the indication of a result of the comparison between the detected pattern 201 and the predetermined pattern. The result may be that the detected patter 201 matches or does not match the predetermined pattern.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A method of controlling a robot, comprising:
- detecting a pattern of a series of external forces applied on a portion of the robot using a current sensor,
- wherein the pattern of the series of external forces is represented by a time-varying waveform that corresponds to a pattern of a magnitude of the series of external forces imposing a change on a torque output by a motor,
- wherein the pattern of the magnitude of the series of external forces is detected using the current sensor based on a change in current supplied to the motor in response to the change on the torque output by the motor;
- comparing the pattern with a predetermined pattern associated with the portion; and
- in accordance with a determination that the detected pattern matches the predetermined pattern, controlling the robot to perform an action corresponding to the predetermined pattern,
- wherein controlling the robot to perform the action corresponding to the predetermined pattern comprises at least one of:
- moving the robot to a location of a previous target, or
- initiating, ceasing, pausing, or restarting a process or a step of the process to operate the previous target by the robot;
- wherein the change in current supplied to the motor detected by the current sensor comprises a corresponding change in the torque output by the motor to maintain the robot in a similar position to overcome the external forces applied on the portion of the robot.

2. The method of claim 1, wherein detecting the pattern of the series of external forces comprises:
- detecting a magnitude of the series of external forces applied on the portion during a predetermined time period.

3. The method of claim 2, wherein detecting the magnitude of the series of external forces comprises:
- detecting the magnitude from at least one of a torque sensor or a current sensor arranged on a joint between two arm links of the robot coupled to each other.

4. The method of claim 1, further comprising:
- generating an indication of a result of the comparison between the detected pattern and the predetermined pattern.

5. The method of claim 4, wherein generating the indication comprises at least one of:
- illuminating a lighting unit;
- playing back a sound;
- vibrating at least one arm link; or
- displaying the result on a display screen.

6. The method of claim 1, wherein controlling the robot to perform an action corresponding to the predetermined pattern further comprises controlling the robot to perform at least one of:
- moving the robot to a location of a next target;
- initiating, ceasing, pausing, or restarting a process or a step of the process to operate the next target by the robot;
- teaching the robot to operate a new target; or
- increasing or decreasing a speed to operate a target.

7. A controller for controlling a robot, comprising:
- one or more processors configured to perform the method of claim 1.

8. A robot comprising the controller of claim 7.

9. The robot of claim 8, further comprising the current sensor coupled to the controller and configured to detect a magnitude of each of the series of external forces applied on the portion during a predetermined time period.

10. The robot of claim 9,
- wherein the current sensor is configured to provide a value of current applied on a motor.

11. The robot of claim 8, further comprising:
- a feedback module configured to present an indication of a result of the comparison between the detected pattern and the predetermined pattern.

12. The robot of claim 11, wherein the feedback module comprises at least one of a lighting unit, a speaker, a driver to vibrate at least one arm link, or a display screen.

13. The robot of claim 8, further comprising a torque sensor coupled to the controller and configured to detect a magnitude of each of the series of external forces applied on the portion during a predetermined time period.

14. The robot of claim 13, wherein the torque sensor is arranged on a joint between two arm links of the robot coupled to each other.

15. The robot of claim 8, further comprising the current sensor coupled to the controller and configured to detect a magnitude of each of the series of external forces applied on the portion during a predetermined time period.

16. The robot of claim 15, wherein the current sensor is configured to provide a value of current applied on a motor.

17. The robot of claim 8, further comprising:
- a torque sensor coupled to the controller and configured to detect a magnitude of each of the series of external forces applied on the portion during a predetermined time period,
  - wherein the torque sensor is arranged on a joint between two arm links of the robot coupled to each other.

18. A controller for controlling a robot, comprising:

one or more processors configured to perform the method of claim 6.

19. A robot comprising the controller of claim 18, further comprising:

wherein the current sensor is coupled to the controller and configured to detect a magnitude of each of the series of external forces applied on the portion during a predetermined time period, wherein the current sensor is configured to provide a value of current applied on a motor; and a feedback module configured to present an indication of a result of the comparison between the detected pattern and the predetermined pattern, wherein the feedback module comprises at least one of a lighting unit, a speaker, a driver to vibrate at least one arm link, or a display screen.

* * * * *